United States Patent [19]

Lund

[11] Patent Number: 5,108,142
[45] Date of Patent: Apr. 28, 1992

[54] WINDSHIELD VISOR

[75] Inventor: Allan W. Lund, Minneapolis, Minn.

[73] Assignee: Lund Industries, Incorporated, Minneapolis, Minn.

[21] Appl. No.: 677,593

[22] Filed: Mar. 27, 1991

Related U.S. Application Data

[63] Continuation of Ser. No. 336,565, Apr. 10, 1989, abandoned, which is a continuation of Ser. No. 66,769, Jun. 25, 1987, abandoned, which is a continuation-in-part of Ser. No. 528,981, Sep. 2, 1983, Pat. No. Des. 291,295.

[51] Int. Cl.⁵ ............................................. B60J 3/00
[52] U.S. Cl. ................................................. 296/95.1
[58] Field of Search ..................... 296/95.1; D12/191

[56] References Cited

U.S. PATENT DOCUMENTS

| D. 85,241 | 9/1881 | Henderson | D12/191 |
|---|---|---|---|
| D. 154,735 | 8/1949 | Arbib | D12/191 |
| D. 154,861 | 8/1949 | Maher | D12/191 |
| D. 156,479 | 12/1949 | Bingman | D12/191 |
| D. 157,555 | 3/1950 | Abrams | D12/191 |
| D. 159,062 | 6/1950 | Hallstead | D12/191 |
| D. 159,144 | 6/1950 | Dieterich | D12/191 |
| D. 239,705 | 4/1976 | Lund . | |
| D. 252,680 | 8/1979 | Kingsley et al. . | |
| D. 261,500 | 10/1981 | Butler . | |
| D. 273,672 | 5/1984 | Lund | D12/191 |
| D. 283,611 | 4/1986 | Kingsley | D12/191 |
| D. 288,309 | 2/1987 | Lund | D12/191 |
| D. 288,310 | 2/1987 | Lund | D12/191 |
| D. 291,295 | 8/1987 | Lund | D12/191 |
| D. 299,713 | 2/1989 | Dunham | D12/191 |
| D. 301,028 | 5/1989 | Buck | D12/191 |
| D. 301,450 | 6/1989 | Kingsley | D12/191 |
| 2,475,901 | 7/1949 | Kipp | 296/95.1 |
| 2,534,763 | 12/1950 | Flavin | 296/95 R |
| 2,566,934 | 9/1951 | Dieterich | 296/95 R |
| 2,567,501 | 9/1951 | Zeis et al. | 296/95 R |
| 2,599,809 | 6/1952 | Branch | 296/95 R |
| 2,777,732 | 1/1957 | Walsh | 296/95.1 |
| 3,214,216 | 10/1965 | Brown, Jr. | 160/370.2 X |
| 4,018,472 | 4/1977 | Mason . | |
| 4,149,749 | 4/1979 | Canal | 296/97 R |
| 4,320,919 | 3/1982 | Butler . | |
| 4,412,698 | 11/1983 | Kingsley | 296/95 R X |
| 4,726,519 | 2/1988 | Haugestad | 296/95 R |
| 4,758,040 | 7/1988 | Kingsley | 403/337 X |
| 4,842,320 | 6/1989 | Kingsley | 296/95.1 |

FOREIGN PATENT DOCUMENTS 829154 2/1960 United Kingdom ............. 296/95 R

OTHER PUBLICATIONS

Sun Visor Product Catalog, undated.

Primary Examiner—Dennis H. Pedder
Attorney, Agent, or Firm—Merchant, Gould, Smith, Edell, Welter & Schmidt

[57] ABSTRACT

A windshield visor has shielding segments interconnected by support structure unitarily formed as part of the visor. Ears are provided to mount the visor to the roof of a vehicle.

4 Claims, 2 Drawing Sheets

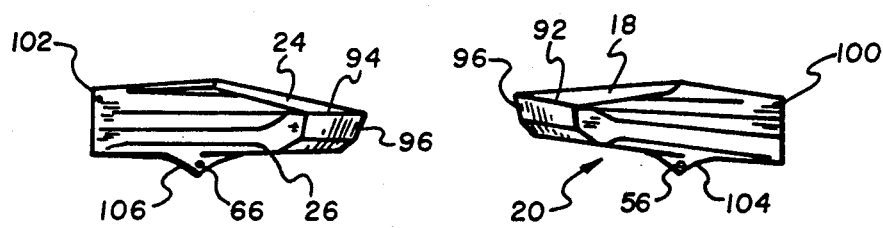
Fig. 4     Fig. 5
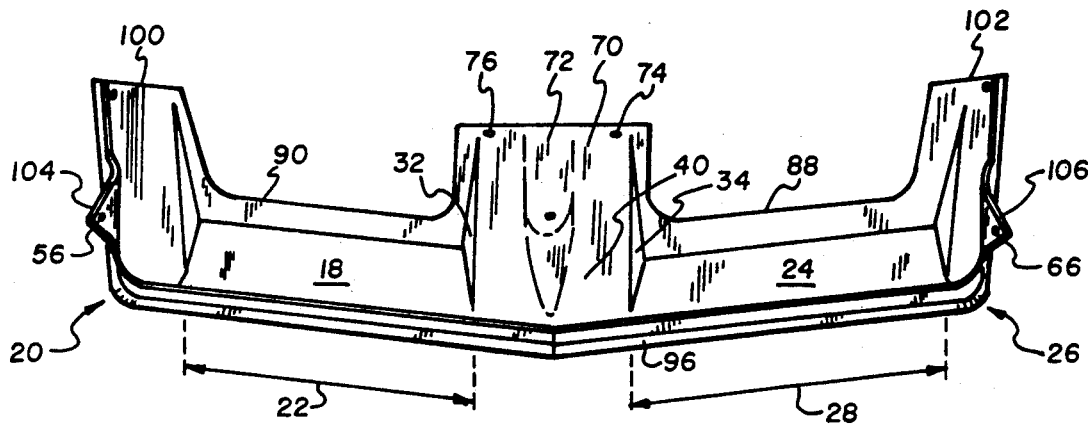
Fig. 6
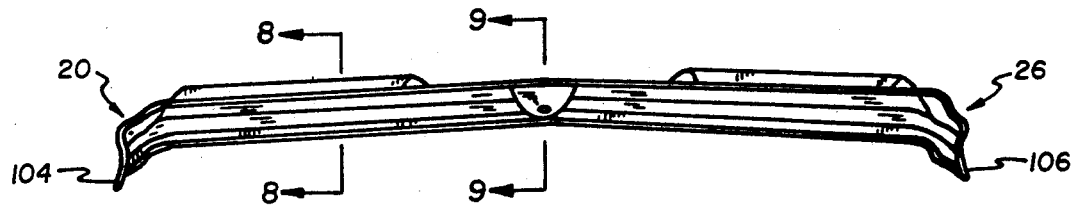
Fig. 7
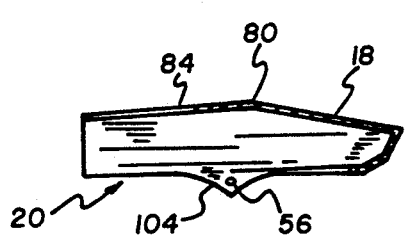   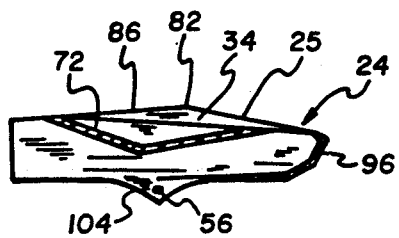
Fig. 8     Fig. 9

WINDSHIELD VISOR

This is a continuation of application Ser. No. 07/336,565, filed Apr. 10, 1989, abandoned, which is a continuation of application Ser. No. 07/066,769, filed Jun. 25, 1987, abandoned, which a continuation in part of application Ser. No. 528,981, filed Sep. 2, 1983 which is now U.S. Pat. No. Des. 291,295 which issued on Aug. 11, 1987.

This invention relates to motor vehicle accessories and more particularly to an external visor for positioning proximate the windshield of a motor vehicle.

SUMMARY OF THE INVENTION

A windshield visor has shielding segments with a support means formed therebetween and unitarily therewith. Attaching means are used to mount the visor to the external roof of the vehicle with the shielding segments extending from the roof generally over the vehicle windshield.

The support means preferably includes downwardly extending surfaces which are interconnected by connection means. The attaching means also preferably includes ear means at the outward ends of the shielding segments and a tongue means all for mounting the visor to the vehicle roof.

In the drawings:

FIG. 4 is a view taken from one end thereof;

FIG. 5 is a view taken from the opposite end thereof;

FIG. 6 is a bottom plan view thereof;

FIG. 7 is a rear elevation thereof; and,

FIG. 8 is a vertical section taken substantially along line 8—8 of FIG. 7: AND

FIG. 9 is a vertical section taken substantially along line 9—9 of FIG. 7.

DESCRIPTION OF ILLUSTRATED EMBODIMENT

Figure 1:
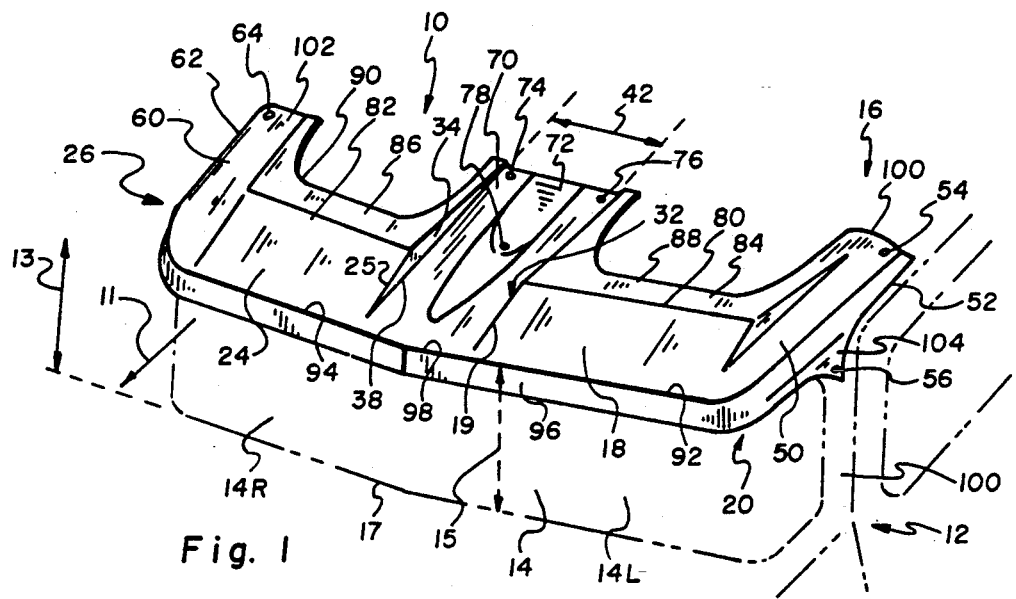
FIG. 1 is a perspective view of a truck having a WINDSHIELD VISOR embodying the concepts of the applicant's invention mounted thereon.

Referring specifically to FIG. 1, a windshield visor 10 of the instant invention is shown externally positioned and mounted to a vehicle 12 which is here shown in phantom. The visor 10 extends over the windshield 14 of the vehicle. As known, the windshield 14 provides the vehicle occupants and operator with protection while at the same time providing visibility for operation. The windshield 14 may also be known as a wind screen and typically is part of a wide variety of motor vehicles including pickup trucks, vans and the like.

The visor 10 of the instant invention is mounted to the vehicle 12 and more particularly, to the exterior roof 16 of the vehicle to extend away therefrom. The visor 10 generally extends forwardly over the windshield 14 to act as a shield as can be seen in FIG. 1. The visor 10 extends outwardly a distance selected in proportion to the vehicle which is shown in FIG. 1.

The visor 10 has a first shielding segment which extends inwardly from proximate a first outward end 20 and a second shielding segment 24 which extends inwardly from proximate a second outward end 26. The first shielding segment 18 and the second shielding segment 24 are in general planar alignment as can be seen in the figures. That is, the first and second segments 18 and 24 are each generally planar surfaces positioned over the left portion 14L and the right portion 14R of the windscreen 14 in the same general physical orientation with respect to the roof 16 and the windshield 14 to provide a uniform appearance and to be approximately the same height 15 from the bottom 17 of the windshield 14. As can be seen from the embodiment illustrated in FIG. 1, the first segment 18 and the second segment 24 are substantially identical except that one is formed for the left side and the other for the right side. They may be regarded as symmetrically and proportionally positioned over their respective left portion 14L and right portion 14R of the windshield to in turn be what is here termed in general planar alignment.

Figure 2:
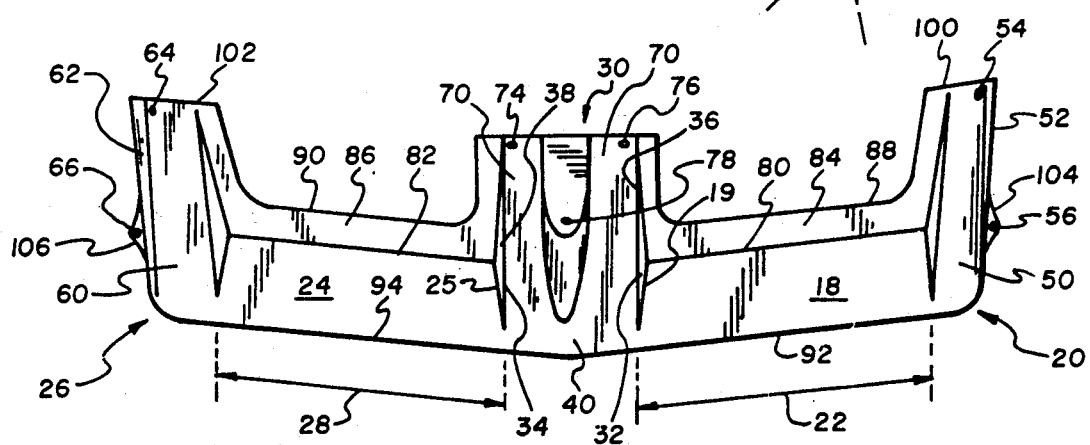
FIG. 2 is a top plan view thereof.
Figure 3:
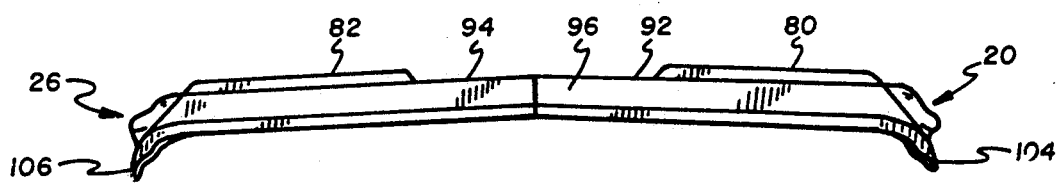
FIG. 3 is a front elevation thereof.

The first segment 18 extends from the outward end 20 inwardly a preselected distance 22 approximately the width of the left windshield segment 14L to an inward end 19 as shown in FIG. 2. The second shielding segment 24 extends from the second outward end 26 inwardly to an inward end 25 a preselected distance 28 as shown in FIG. 2. Support means 30 are positioned between and formed unitarily with the first and second shielding segments 18 and 24 to provide rigid support for the visor 10.

The support means 30 here shown includes a first downwardly extending planar surface 32 and a second downwardly extending planar surface 34. The first and second downwardly extending planar surfaces 32 and 34 are each unitarily formed with the first and second shielding segments 18 and 24 respectively at their inward ends 19 and 25. The surfaces 32 and 34 are here shown to be generally mirror images of each other and extend downwardly to act as a rib. As best seen in FIG. 2, the surfaces 32 and 34 extend downwardly at a small angle from the vertical.

The first and second downwardly extending generally planar surfaces 32 and 34 each have a lower edge 36 and 38 respectively. Interconnecting means 40 is unitarily formed with and extends between the lower edges 36 and 38 to rigidly interconnect the lower edges 36 and 38 and, in turn, the downwardly extending planar surfaces 32 and 34 and further, the first shielding segment 18 with the second shielding segment 24. As here shown, the interconnecting means 40 is preferably planar surface means sized in width 42 to be in proportion generally as shown, which is less than half the width 22 and 28 of the shielding segments 18 and 24 which, a noted hereinbefore, are formed to be substantially symmetrical and as here illustrated to be substantially identical in width 22 and 28.

The visor 10 also includes attaching means which are mechanically and unitarily formed with the first and second shielding segments 18 and 24 for mounting the visor 10 to the roof 16 of the vehicle 12. The attaching means here illustrated includes a first ear means, unitarily formed with the first shielding segment 18 at the outward end thereof 20. The first ear means 50 has portions 52 formed to conform to the roof 16 of the vehicle 12 with apertures 54 and 56 to accommodate appropriate fasteners.

The attaching means also includes a second ear means 60 (FIG. 2) unitarily formed with the second shielding segment 24 at the outward end thereof 26. The second ear means 60 includes portions 62 formed to conform to the roof 16 of the vehicle 12, with appropriate apertures 64 and 66 to accommodate appropriate fasteners.

The attaching means also includes a tongue means here shown to be centrally positioned approximately between the first shielding segment 18 and the second shielding segment 24 and integrally and unitarily formed with the interconnecting means 40. The tongue means 70 is integrally formed with the interconnecting means 40 as an extension thereof as can be seen in FIGS. 1 and 2. The tongue means is formed unitarily with the support means and interconnecting means and to conform with the roof 16 of the vehicle. The tongue means 70 may also include an angulated surface 72 formed to conform with the roof 16 of the vehicle. The tongue means preferably includes apertures 74, 76 and 78 to accommodate appropriate fastening devices to fasten the visor to the roof 16 of the vehicle 12.

The first shielding segment 18 and the second shielding segment 24 each have a rearward edge 80 and 82 respectively. Generally planar surfaces 84 and 86 are each unitarily formed respectively with said first and second shielding segments 18 and 24 at the rearward edges 80 and 82 to extend between the first ear means 50 and the tongue means 70 and between the second ear means 60 and the tongue means 70 as shown. The generally planar surfaces 84 and 86 as shown are in general planar alignment with each other and have arcuate rear edges 88 and 90.

Referring specifically to FIGS. 4 and 5, it can be seen that the first shielding segment 18 and the second shielding segment 24 each have respectively a front edge 92 and 94. A downwardly and inwardly extending lip 96 is unitarily formed therewith to extend along the width 22 and 28 of the first and second segments 18 and 24 respectively and along the front edge 98 of the interconnecting means 40 as well as around the first and second ends 20 and 26 respectively to extend rearwardly into the ear means 50 and 60 respectively as can be seen in perspective in FIG. 1.

As noted hereinbefore, the first ear means 50 and the second ear means 60 each have portions 52 and 62 respectively which are formed to conform with the roof 16 of the vehicle 12. More particularly, the portions 52 and 62 include a rear portion 100 and 102, which are arcuately formed to conform to the shape of the roof 16 of the vehicle to which the visor 10 is attached. The ear portion also includes a downwardly extending portion 104 and 106 (FIG. 5 and 6) to provide for mounting of the visor 10 to the downwardly extending portions of the roof which may also be regarded as a door post or roof post 108.

I claim:

1. A vehicle visor for mounting to the exterior roof of a vehicle to extend away therefrom, said visor comprising:
a first shielding segment extending inwardly from proximate a first outward end, said first shielding segment having a rear edge;
a second shielding segment extending inwardly from proximate a second outward end, said second shielding segment having a rear edge;
support means between and unitarily formed with said first and second shielding segments, said support means including a rear edge, a lower most point, a front edge, and a channel surface, wherein said channel surface extends from said rear edge of said support means downwardly and forwardly to aid lower most point, and extends upwardly and forwardly from said lower most point toward said front edge.

2. A vehicle windshield visor comprising:
a first shielding segment extending inwardly from proximate a first outward end, said first shielding segment having a rear edge;
a second shielding segment extending inwardly from proximate a second outward end, said second shielding segment having a rear edge;
a central segment to join said first and second shielding segments, said central segment having a rear edge and a front edge;
first ear means joined to said first shielding segment at said first outward end to extend rearwardly beyond said rear edge of said first shielding segment;
second ear means joined to said second shielding segment at said second outward end to extend rearwardly beyond said rear edge of said second shielding segment; and
tongue means unitarily formed with said central segment, said tongue means includes a lower most point located below said first and second shielding segments and approximately midway between said front and rear edges of said central segment, wherein said tongue means extends from said lower most point upwardly and rearwardly beyond said rear edges of said first and second shielding segments.

3. A windshield visor for mounting to a roof of a vehicle to shield a windshield adjacent a front surface of the roof, the visor comprising:
a first shielding segment having a rear edge;
a first outer end extending rearwardly beyond the rear edge of the first shielding segment;
a second shielding segment having a rear edge;
a second outer end extending rearwardly beyond the rear edge of the second shielding segment;
a central support segment having a forward and rearward edges, the central support segment extending rearwardly beyond the rear edges of the first and second shielding segments to the rearward edge of the central support segment; and
a depressed central segment extending from the rearward edge of the central support segment downwardly and forwardly to a lower most point located between the forward and rearward edges of the central support segment;
wherein the lower most point of the depressed central segment is, when viewed from above, in general alignment with the rear edges of the first and second shielding segments.

4. The visor according to claim 3 wherein the central support segment includes a support surface formed downwardly from the first and second shielding segments, the depressed central segment extending below the support surface.

* * * * *